(12) United States Patent
Wang

(10) Patent No.: US 9,945,503 B2
(45) Date of Patent: Apr. 17, 2018

(54) ROTATE-TO-PRESS INFLATION ADAPTOR FOR ENGLISH VALVES

(71) Applicant: BETO ENGINEERING AND MARKETING CO., LTD., Taichung (TW)

(72) Inventor: Lopin Wang, Taichung (TW)

(73) Assignee: BETO ENGINEERING AND MARKETING CO., LTD., Taichung (TW)

( * ) Notice: Subject to any disclaimer, the term of this patent is extended or adjusted under 35 U.S.C. 154(b) by 113 days.

(21) Appl. No.: 15/232,782

(22) Filed: Aug. 9, 2016

(65) Prior Publication Data

US 2018/0045349 A1    Feb. 15, 2018

(51) Int. Cl.
| | |
|---|---|
| *F16L 19/02* | (2006.01) |
| *F16L 37/38* | (2006.01) |
| *F16L 37/12* | (2006.01) |
| *F16K 15/20* | (2006.01) |
| *B60C 29/06* | (2006.01) |

(52) U.S. Cl.
CPC .............. *F16L 37/38* (2013.01); *F16L 19/02* (2013.01); *F16L 37/12* (2013.01); *B60C 29/064* (2013.01); *F16K 15/20* (2013.01); *F16L 37/1235* (2013.01); *Y10T 137/3724* (2015.04)

(58) Field of Classification Search
CPC ......... F16K 15/20; F16L 19/005; F16L 19/02; F16L 19/0206; F16L 21/02; F16L 37/0841; F16L 37/12; F16L 37/1235; F16L 37/26; F16L 37/38; B60C 29/06; B60C 29/064; B60S 5/04; Y10T 137/3854; Y10T 137/3724

USPC ................. 137/223, 231; 251/264, 266–267, 251/273–278; 285/114–116, 305, 285/307–310, 313, 320, 325–327

See application file for complete search history.

(56) References Cited

U.S. PATENT DOCUMENTS

| | | | | |
|---|---|---|---|---|
| 1,494,291 | A * | 5/1924 | Sanford .................. | F16N 21/04 285/325 |
| 1,564,965 | A * | 12/1925 | Kraft ....................... | F16L 37/26 279/9.1 |
| 3,396,938 | A * | 8/1968 | Matsui .................... | F16K 31/04 251/229 |
| 4,015,865 | A * | 4/1977 | Kongelka ............... | F16L 25/00 137/316 |

(Continued)

*Primary Examiner* — Mary McManmon
*Assistant Examiner* — Richard K Durden
(74) *Attorney, Agent, or Firm* — Leong C. Lei

(57) ABSTRACT

A rotate-to-press inflation adaptor is provided for use with an English valve and includes a valve connector having a side surface recessed inwardly to form a positioning cavity having an inside surface in which slide channels are formed and two opposite ends respectively forming a valve opening and a coupler opening in communication with the positioning cavity. The coupler includes an air charging hole extending axially therethrough and an outer surface on which an external thread and two slide blocks are formed for being slidably received in the slide channels for reciprocal movement. The rotary knob has a through hole in which an internal thread is formed and the knob body is fit over and combinable with the valve connector in a rotatable manner with the internal and external threads engaging each other. An air tube is connected to the coupler.

7 Claims, 8 Drawing Sheets

(56) References Cited

U.S. PATENT DOCUMENTS

| | | | | |
|---|---|---|---|---|
| 4,076,278 A * | 2/1978 | Chateau | ............... | F16L 37/002 285/18 |
| 4,778,149 A * | 10/1988 | Pesovic | .................... | F16K 1/02 137/454.5 |
| 5,379,796 A * | 1/1995 | Wang | ....................... | B60S 5/04 137/231 |
| 5,429,395 A * | 7/1995 | Ketcham | ............ | F16L 37/0847 285/319 |
| 5,941,577 A * | 8/1999 | Musellec | ........... | F16L 37/0841 285/317 |
| 6,843,270 B1 * | 1/2005 | Wang | ....................... | B60S 5/04 137/223 |
| 2011/0123262 A1 * | 5/2011 | Huang | ................ | F04B 33/005 403/299 |

\* cited by examiner

ROTATE-TO-PRESS INFLATION ADAPTOR FOR ENGLISH VALVES

(a) TECHNICAL FIELD OF THE INVENTION

The present invention relates generally to an inflation adaptor for English valves, and more particularly to a rotate-to-press inflation adaptor for English valves.

(b) DESCRIPTION OF THE PRIOR ART

Bicycle tire valves can be available for various types, generally classified as American (Schrader) valves, French (Presta) valves, and English valves, each being of specific advantages and disadvantages. All these types of bicycle tire valves have been used in different areas and groups.

However, for inflation with an English valve, a specific inflation adaptor that is dedicated for the English valve must be used. The commonly used adaptors for English valves have a very complicated structure, which leads to an increased manufacture cost, and requires a complicated and difficult operation process.

SUMMARY OF THE INVENTION

In view of the above problem, to overcome the drawbacks of the conventional inflation adaptors for English valves that the structure is complicated, the manufacturing cost is high, and the operation is difficult, the present invention aims to provide a rotate-to-press inflation adaptor for English valves, which generally comprises a valve connector, a coupler, a rotary knob, and an air tube. The valve connector has a side surface that is inwardly recessed to form a positioning cavity extending in a direction from outside to inside. The valve connector has an end in which a valve opening is formed to extend inwardly in an axial direction to communicate with the positioning cavity. The valve connector has an opposite end in which a coupler opening is formed to extend inwardly in the axial direction to communicate with the positioning cavity. The positioning cavity has two opposite side walls in which two slide channels are respectively formed and extending in the axial direction. The coupler comprises a coupler body and an air charging hole extending in the axial direction through the coupler body. The coupler body has an external thread and two slide blocks formed thereon. The slide blocks are slidably received in the slide channels of the valve connector respectively so as to be reciprocally movable along the slide channels. The rotary knob comprises a knob body and an internal thread formed in and arranged to extend in the axial direction through the knob body. The knob body is combinable with the valve connector in a manner of being rotatable with respect thereto. The internal thread of the rotary knob is in engagement with the external thread of the coupler. The air tube is connected to the coupler. With such an arrangement, advantages including simple structure, easy operation, and better adaptability can be achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
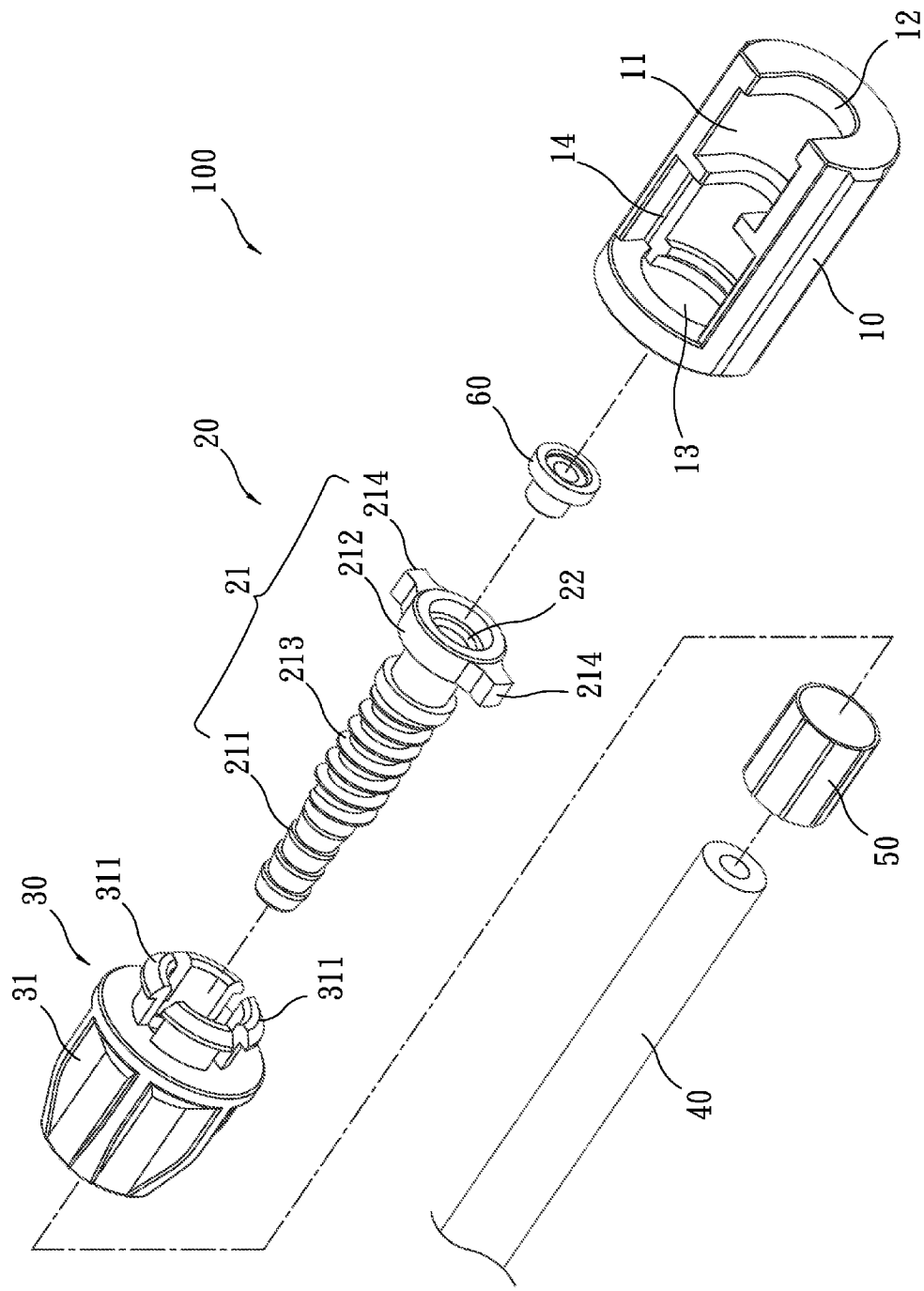
FIG. 1 is an exploded view showing a preferred embodiment of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-7, a rotate-to-press inflation adaptor according to a preferred embodiment, generally designated at 100, is provided for use with an English valve and generally comprises a valve connector 10, a coupler 20, a rotary knob 30, an air tube 40, a clamp sleeve 50, and a flexible pressing ring 60.

Figure 2:
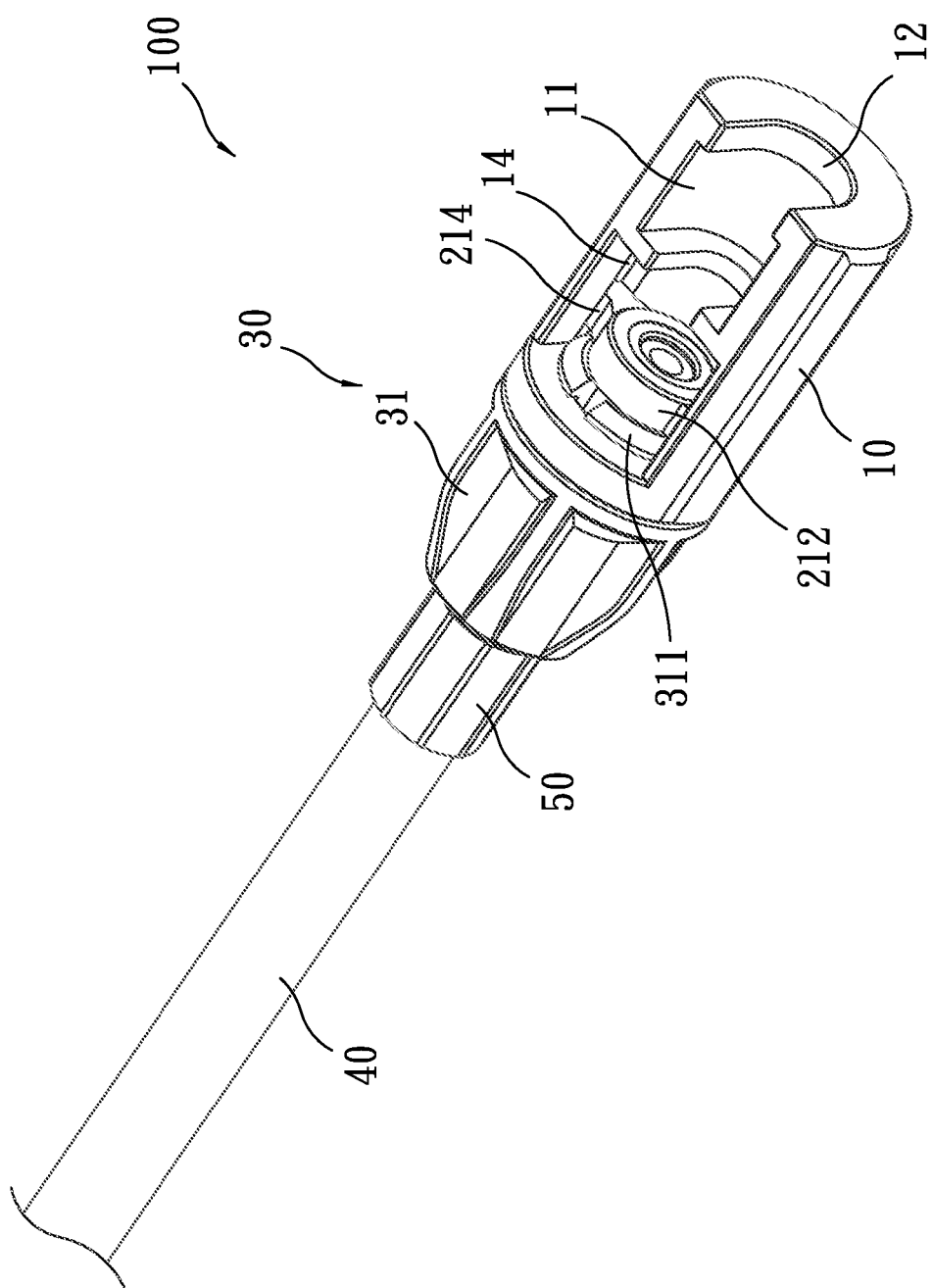
FIG. 2 is a perspective view showing the embodiment of FIG. 1 in an assembled condition.
Figure 3:
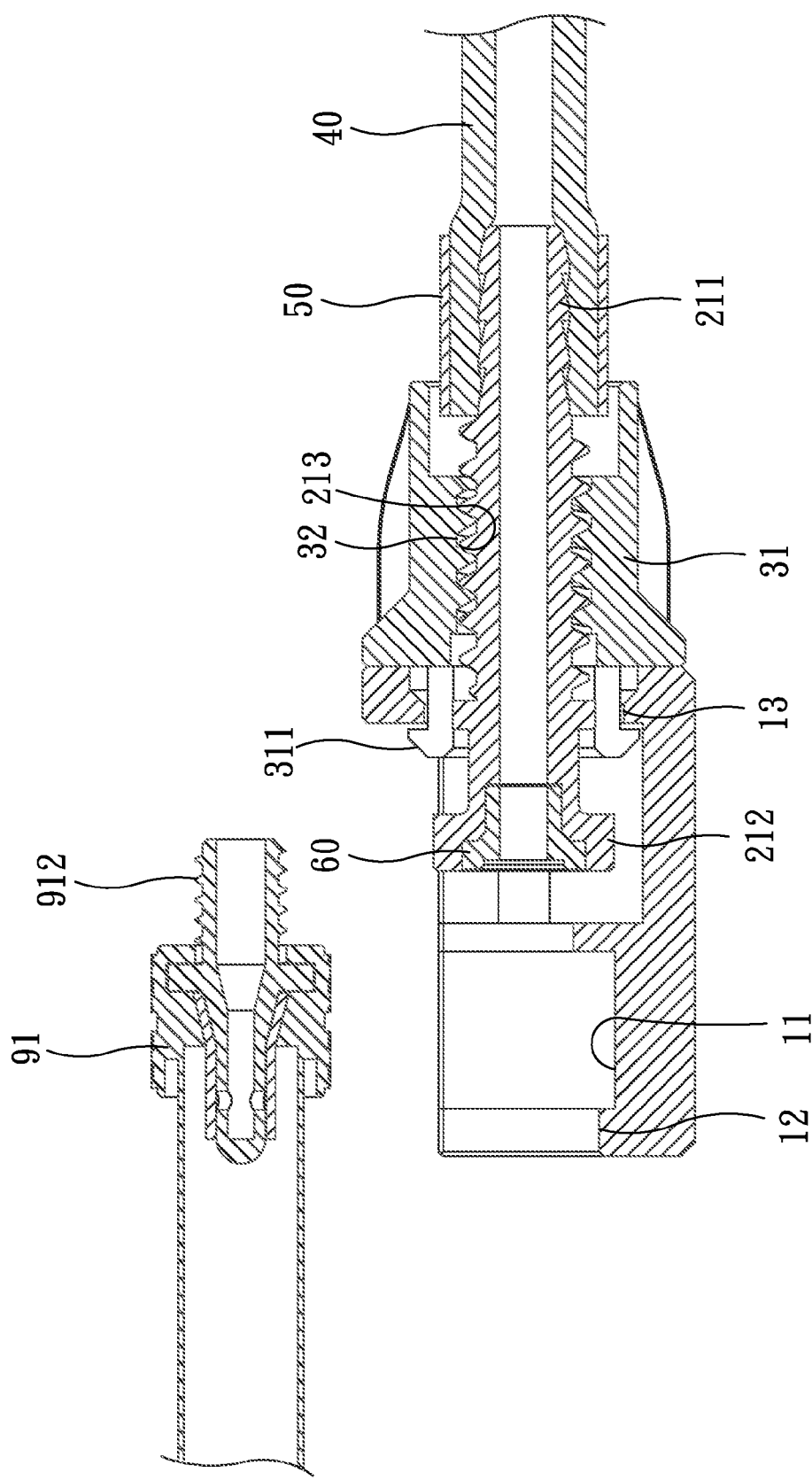
FIG. 3 is a cross-sectional view showing the embodiment of FIG. 1 in the assembled condition.

Referring to FIGS. 1-3, the valve connector 10 comprises a positioning cavity 11 that is formed in a side surface thereof and is inwardly recessed and extends in from outside to inside. The valve connector 10 comprises a valve opening 12 formed in an end thereof and extending inwardly, in an axial direction, to communicate with the positioning cavity 11. The valve connector 10 comprises a coupler opening 13 formed in an opposite end thereof and extending inwardly, in the axial direction to communicate with the positioning cavity 11. The positioning cavity 11 has two opposite sidewalls in which two slide channels 14 are respectively formed and extending in the axial direction.

Referring to FIGS. 1-3, the coupler 20 comprises a coupler body 21 and an air charging hole 22 extending, in the axial direction, through the coupler body 21. The coupler body 21 has an outer circumferential surface that comprises a tube connection section 211, a valve connection section 212, and an external thread 213 formed and connected between the tube connection section 211 and the valve connection section 212. The valve connection section 212 is provided with two slide blocks 214 respectively at two opposite sites of an outside surface thereof. The side blocks 214 of the coupler 20 are slidably received in the slide channels 14 of the valve connector 10 respectively so as to be reciprocally movable along the slide channels 14.

Referring to FIGS. 1-3, the rotary knob 30 comprises a knob body 31 in which a through hole is formed to axially extend therethrough and an internal thread 32 formed in an inside surface of the through hole and thus extending through the knob body 31. The knob body 31 has an end from which a plurality of hooking pawls 311 projects outwards. The hooking pawls 311 are receivable through the coupler opening 13 of the valve connector 10 to engage, through hooking, and connect with the valve connector 10 in a manner of being in-situ rotatable about the axial direction. The internal thread 32 of the rotary knob 30 is in mating engagement with the external thread 213 of the coupler 20.

Referring to FIGS. 1-3, the air tube 40 has an end received through the internal thread 32 of the through hole of the rotary knob 30 to be jointed to the tube connection section 211 of the coupler 20 and the air tube 40 has an opposite end that is connectable to an air pump or air storage canister (not shown).

Referring to FIGS. 1-3, the clamp sleeve 50 is provided for tightly clamping and fixing the air tube 40 on the tube connection section 211 of the coupler 20 to prevent separation of the air tube 40 and the coupler 20 from each other.

Referring to FIGS. 1-3, the flexible pressing ring 60 is deformable through application of an external force and is arranged inside the valve connection section 212 of the coupler 20.

Thus, the above provides a description of components of a rotate-to-press inflation adaptor 100 for English valves according to a preferred embodiment of the present invention, and the assembly thereof. In the following, an operation and use will be described.

Figure 4:
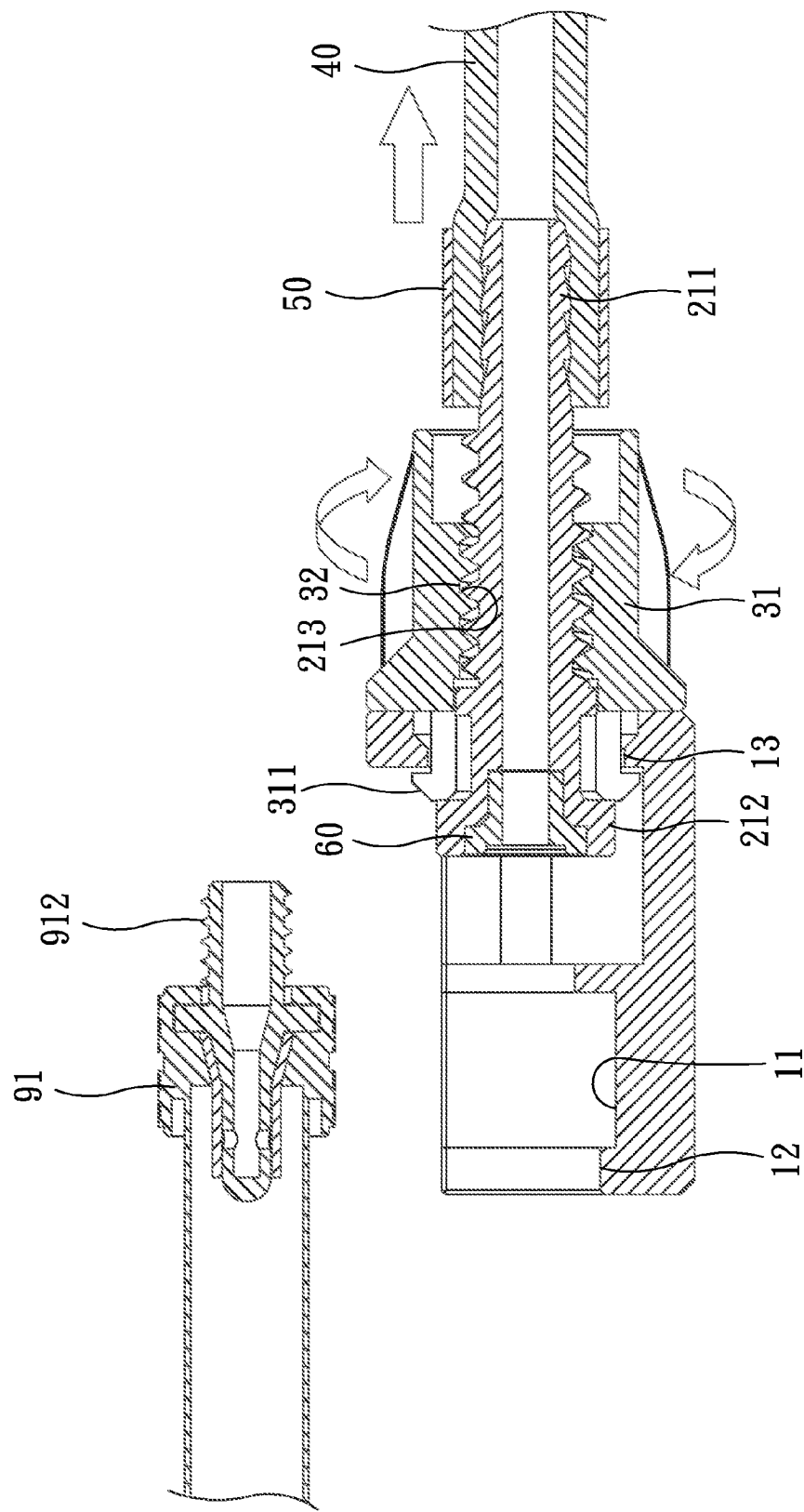
FIGS. 4-7 are schematic views demonstrating an operation of the embodiment shown in FIG. 1.
Figure 5:
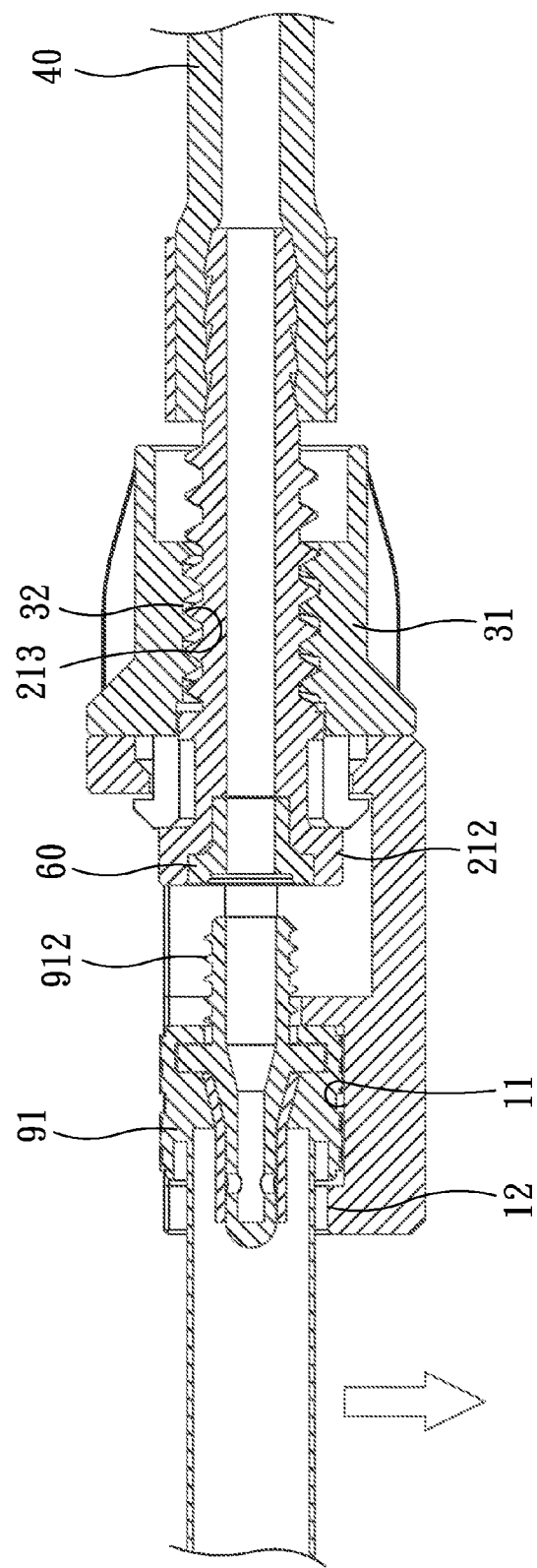
Figure 6:
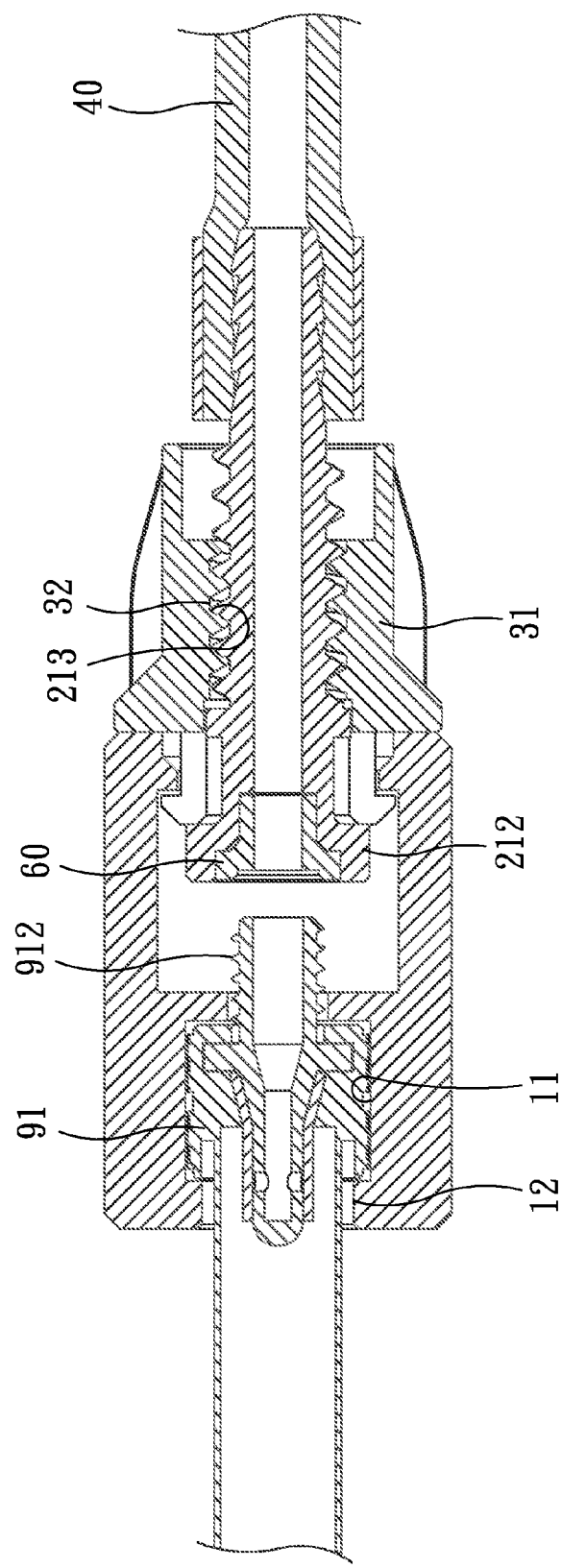
Figure 7:
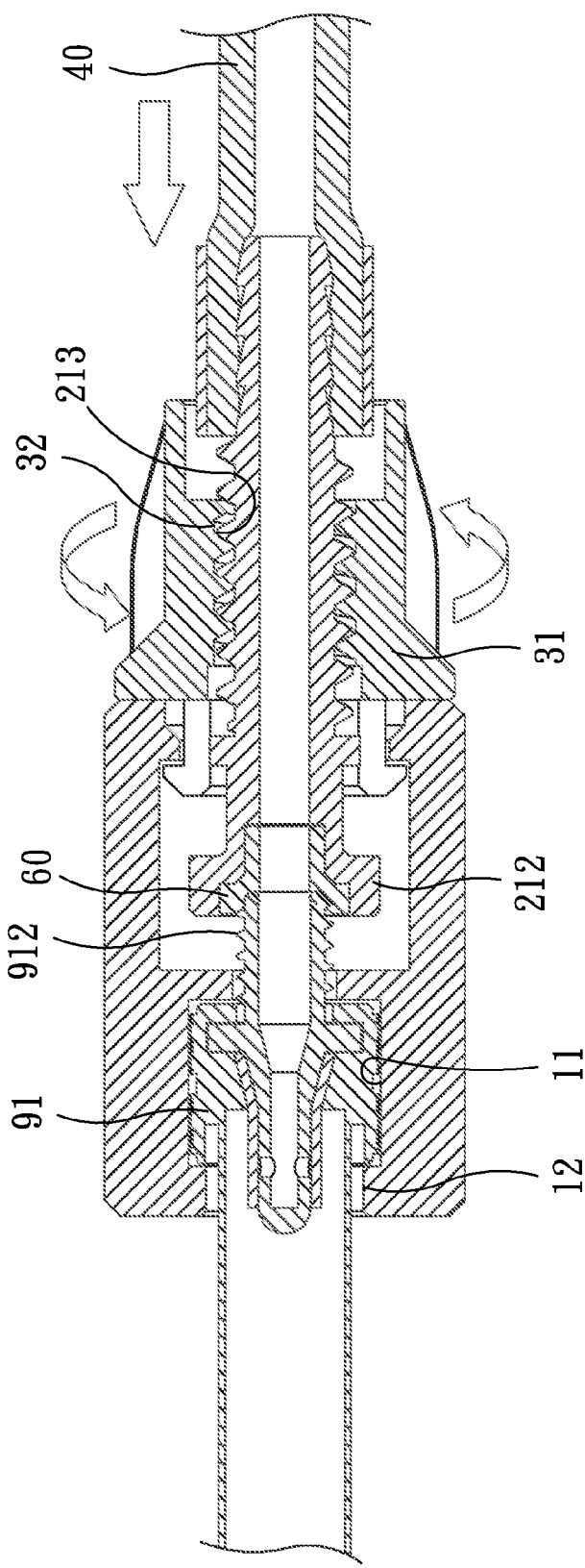

In an attempt for charging air to an English valve 91 (as shown in FIG. 3), the rotary knob 30 is first rotated in a rotation direction such that through the threading engagement between the internal and external threads 32, 213, the coupler 20 is caused to move along the slide channels 14 in a direction toward the coupler opening 13 (as shown in FIG. 4). Next, the English valve 91 is positioned in the positioning cavity 11 of the valve connector 10 such that an air charging end 912 of the English valve 91 faces the coupler 20 (as shown in FIGS. 5 and 6). Then, the rotary knob 30 is rotated in an opposite rotation direction to drive the coupler 20 to move in a direction toward the valve opening 12 so that the flexible pressing ring 60 that is located inside the valve connection section 212 of the coupler 20 is caused to press against the air charging end 912 of the English valve 91 (as shown in FIG. 7), so that air or gas that is supplied from the air pump or air storage canister can be fed through the air tube 40 into the English valve 91 to realize charging air into the English valve 91.

Thus, due to the simple structure, the present invention may greatly reduce the cost. And, through an operation of rotating the rotary knob, the present invention can be connected to the English valve. The operation is easy and convenient.

Figure 8:
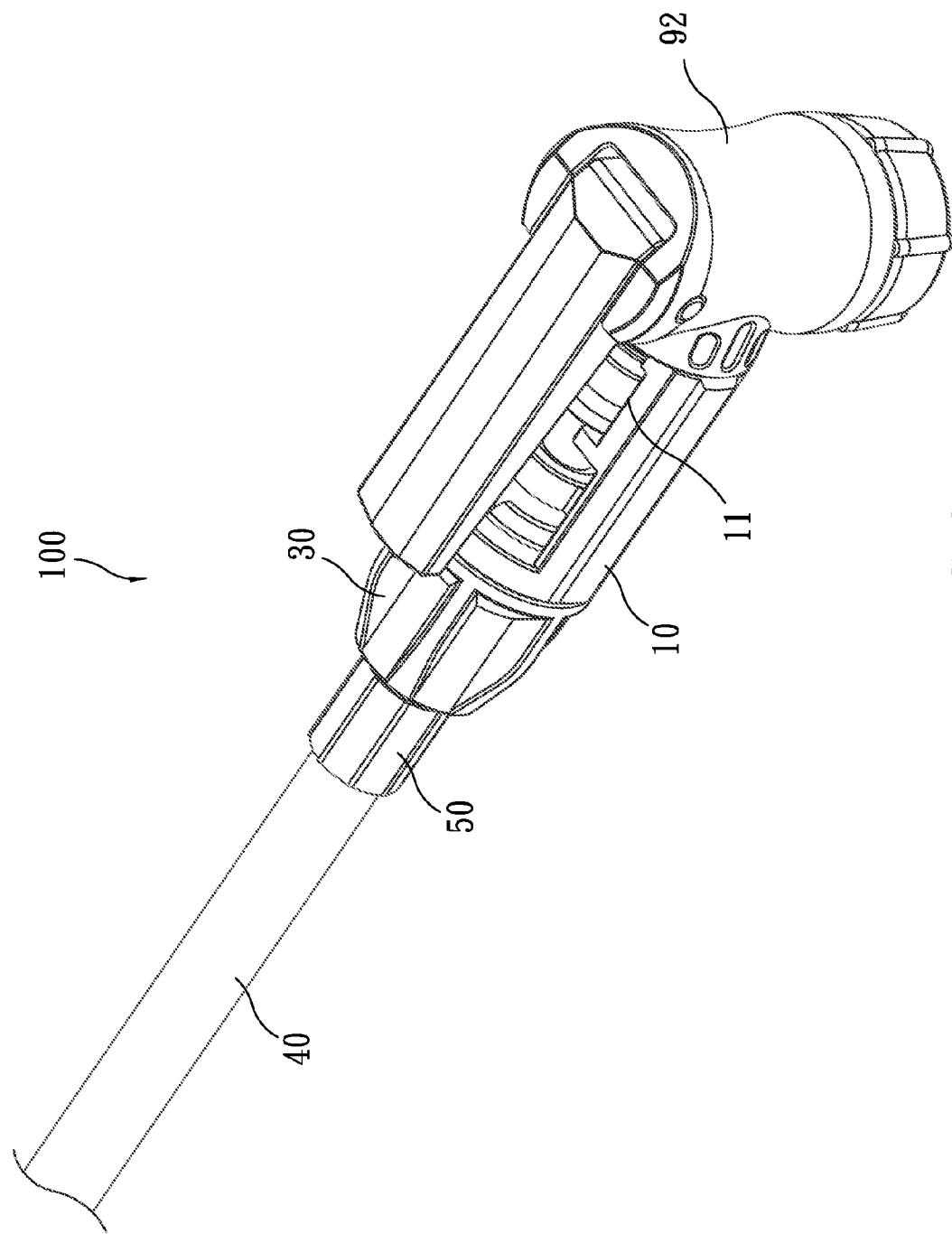
FIG. 8 is a perspective view illustrating another embodiment of the present invention.

In addition, as shown in FIG. 8, besides being capable of receiving an English valve to be disposed therein, the positioning cavity 11 may receive and connect with an American/French dual purpose adaptor 92 therein so that in addition to directly charging air to an English valve, through the American/French dual purpose adaptor, the present invention is applicable to charging air to an American valve or a French valve, thereby expanding the adaptability of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A rotate-to-press inflation adaptor for use with an English valve, comprising:
    a valve connector, which comprises a side surface that is inwardly recessed to form a positioning cavity extending in a direction from outside to inside, the valve connector having an end in which a valve opening is formed to extend inwardly in an axial direction to communicate with the positioning cavity, the valve connector having an opposite end in which a coupler opening is formed to extend inwardly in the axial direction to communicate with the positioning cavity, the positioning cavity having two opposite side walls in which two slide channels are respectively formed and extending in the axial direction;
    a coupler, which comprises a coupler body and an air charging hole extending in the axial direction through the coupler body, the coupler body comprising an external thread and two slide blocks formed thereon, the slide blocks being slidably received in the slide channels of the valve connector respectively so as to be reciprocally movable along the slide channels;
    a rotary knob, which comprises a knob body and an internal thread formed in and arranged to extend in the axial direction through the knob body, the knob body being combinable with the valve connector in a manner of being rotatable with respect thereto, the internal thread of the rotary knob being in engagement with the external thread of the coupler; and
    an air tube, which is connected to the coupler.

2. The rotate-to-press inflation adaptor according to claim 1, wherein the coupler body has an outer circumferential surface that comprises a tube connection section, a valve connection section, and the external thread that is connected between the tube connection section and the valve connection section, the two slide blocks being formed on two opposite sites of an outside surface of the valve connection section, the air tube being connected to the tube connection section.

3. The rotate-to-press inflation adaptor according to claim 2 further comprising a flexible pressing ring, which is received and retained in the valve connection section of the coupler.

4. The rotate-to-press inflation adaptor according to claim 1, wherein the knob body has an end from which a plurality hooking pawls projects outward, the hooking pawls being receivable through the coupler opening of the valve connector to engage, through hooking, with the valve connector in a manner of being in-situ rotatable about the axial direction.

5. The rotate-to-press inflation adaptor according to claim 1 further comprising a clamp sleeve that securely clamps and fixes the air tube on the coupler.

6. The rotate-to-press inflation adaptor according to claim 1, wherein the positioning cavity of the valve connector is for receiving an English valve therein.

7. The rotate-to-press inflation adaptor according to claim 1, wherein the positioning cavity of the valve connector receives an American/French dual-purpose adaptor to be disposed therein.

* * * * *